United States Patent
Jenson

(10) Patent No.: US 9,015,043 B2
(45) Date of Patent: Apr. 21, 2015

(54) CHOOSING RECOGNIZED TEXT FROM A BACKGROUND ENVIRONMENT

(75) Inventor: Scott Jenson, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1140 days.

(21) Appl. No.: 12/896,507

(22) Filed: Oct. 1, 2010

(65) Prior Publication Data

US 2012/0084312 A1    Apr. 5, 2012

(51) Int. Cl.
*G10L 15/00*    (2013.01)
*G06F 17/30*    (2006.01)

(52) U.S. Cl.
CPC .................................. *G06F 17/3097* (2013.01)

(58) Field of Classification Search
USPC .......................... 704/235, 246, 247, 251, 252
See application file for complete search history.

(56) References Cited

U.S. PATENT DOCUMENTS

| | | | |
|---|---|---|---|
| 6,188,831 B1* | 2/2001 | Ichimura | 386/241 |
| 7,536,408 B2 | 5/2009 | Patterson | |
| 7,580,921 B2 | 8/2009 | Patterson | |
| 7,599,914 B2 | 10/2009 | Patterson | |
| 7,630,964 B2* | 12/2009 | Xin et al. | 1/1 |
| 2003/0069877 A1* | 4/2003 | Grefenstette et al. | 707/2 |
| 2004/0199394 A1* | 10/2004 | Kuzunuki et al. | 704/277 |
| 2006/0004743 A1* | 1/2006 | Murao et al. | 707/4 |
| 2007/0136070 A1 | 6/2007 | Lee | |
| 2008/0162129 A1 | 7/2008 | Cheng | |
| 2009/0043581 A1* | 2/2009 | Abbott et al. | 704/254 |
| 2009/0055185 A1* | 2/2009 | Nakade et al. | 704/257 |
| 2009/0113475 A1* | 4/2009 | Li | 725/39 |
| 2009/0157379 A1* | 6/2009 | Chen et al. | 704/3 |
| 2009/0228281 A1* | 9/2009 | Singleton et al. | 704/275 |
| 2009/0240668 A1* | 9/2009 | Li | 707/3 |
| 2009/0327263 A1* | 12/2009 | Maghoul | 707/5 |
| 2010/0262591 A1* | 10/2010 | Lee et al. | 707/706 |
| 2011/0055256 A1* | 3/2011 | Phillips et al. | 707/769 |
| 2011/0060587 A1* | 3/2011 | Phillips et al. | 704/235 |
| 2011/0066634 A1* | 3/2011 | Phillips et al. | 707/769 |
| 2011/0131042 A1* | 6/2011 | Nagatomo | 704/240 |

(Continued)

FOREIGN PATENT DOCUMENTS

| | | |
|---|---|---|
| KR | 2001-0064061 A | 7/2001 |
| KR | 2007-0041083 A | 4/2007 |
| KR | 2007-0119153 A | 12/2007 |
| KR | 2009-0106569 A | 10/2009 |

OTHER PUBLICATIONS

Korean Intellectual Property Office, International Search Report in International Patent Application No. PCT/US11/54367, May 2, 2012, 4 pp.

(Continued)

*Primary Examiner* — Leonard Saint Cyr
(74) *Attorney, Agent, or Firm* — Leydig, Voit & Mayer, Ltd.

(57) ABSTRACT

A computer-implemented method includes receiving an electronic representation of one or more human voices, recognizing words in a first portion of the electronic representation of the one or more human voices, and sending suggested search terms to a display device for display to a user in a text format. The suggested search terms are based on the recognized words in the first portion of the electronic representation of the one or more human voices. A search query is received from the user, which includes one or more of the suggested search terms that were displayed to the user.

30 Claims, 9 Drawing Sheets

(56) References Cited

U.S. PATENT DOCUMENTS

2011/0191339 A1* 8/2011 Ramanathan et al. ........ 707/732
2013/0144834 A1* 6/2013 Lloyd et al. ................... 707/617

OTHER PUBLICATIONS

Korean Intellectual Property Office, Written Opinion in International Patent Application No. PCT/US11/54367, May 2, 2012, 6 pp.

* cited by examiner

300

Person 1 (0:00): Did I tell you that I am going to Brazil for vacation?

Person 2 (0:03): Cool! Are you going for Carnival?

Person 1 (0:06): No. Actually, we are most looking forward to Iguazu Falls – it's this natural wonder on the border with Argentina and Paraguay.

Person 3 (0:12): Yeah, I've heard great things about Iguazu. We think Niagara Falls is impressive, but Iguazu is supposedly blows it away. Are you guys doing some kind of ecotour down there?

Person 1 (0:20): Not really. The kids are excited about it, because we told them that it was in "Indiana Jones," and my husband wants to see it because he studied 16$^{th}$ century exploration of South America, and I think there is some story about a Spanish explorer finding the Falls a couple hundred years before it was rediscovered by some other European.

Person 3 (0:38): Hunh, that's interesting. Was it Vasco da Gama?

Person 2 (0:43): Wasn't he Portuguese? And didn't he explore Africa, not South America?

Person 3 (0:48): He did go around the tip of Africa, but I thought he went to Brazil later, maybe by accident.

Person 2 (0:55): hmmm…. I don't think it was da Gama.

Person 1 (0:59): I really don't know either. I could probably look it up in my husband's undergrad thesis – ha, ha! Anyway, with the kids there we might just get the "Indiana Jones" version of history. Hollywood seems to love Igauzu too. Wasn't there a James Bond movie there, and a Jeremy Iron flick, too?

Person 2 (1:12): Yes! Was it "Golden Eye?" I can picture the Jeremy Irons movie, but I can't remember the name…

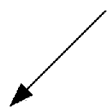

did i tell you that i am going to brazil for vacation cool are you going for carnival no actually we are most looking forward to iguazu falls its this natural wonder on the border with argentina and paraguay yeah, i've heard great things about iguazu we think niagara falls is impressive, but iguazu supposedly blows it away are you guys doing some kind of ecotour down there not really the kids are excited about it because we told them that it was in indiana jones and my husband wants to see it because he studied sixteenth century exploration of south america and i think there is some story about a spanish explorer finding the falls a couple hundred years before it was rediscovered by some other european that's interesting was it vasco da gama wasn't he portuguese and didn't he explore africa not south america he did go around the tip of africa but i thought he went to brazil later maybe by accident i don't think it was da gama i really don't know either i could probably look it up in my husband's undergrad thesis ha ha anyway with the kids there we might just get the indiana jones version of history hollywood seems to love igauzu too wasn't there a james bond movie there and a jeremy iron flick too yes was it golden eye i can picture the jeremy irons movie but i can't remember the name...

FIG. 4

CHOOSING RECOGNIZED TEXT FROM A BACKGROUND ENVIRONMENT

TECHNICAL FIELD

This description relates the automatic generation of terms for use in a search queries and, in particular, to choosing recognized text from a background environment.

BACKGROUND

Searching for online information has become a ubiquitous need. Often searching for online information involves the submission of search query terms that are used to locate information. The process of defining and submitting the search query terms can involve an interaction between a person and a computing device that can distract the attention of the person from other activities, such as a conversation. Thus, a need exists for the automatic generation of search query terms without distracting a person.

SUMMARY

In a general aspect, a computer-implemented method includes receiving an electronic representation of one or more human voices, recognizing words in a first portion of the electronic representation of the one or more human voices, and sending suggested search terms to a display device for display to a user in a text format. The suggested search terms are based on the recognized words in the first portion of the electronic representation of the one or more human voices. A search query is received from the user, which includes one or more of the suggested search terms that were displayed to the user.

Implementations can include one or more of the following features. For example, the electronic representation of the one or more human voices can include an audio file. An indication can be received from the user that the first portion of the electronic representation begins at a first time of the audio file and ends a second time of the audio file. The first portion of the electronic representation of the one or more human voices can include a portion of a continuous stream of audio data.

Suggested search terms can be selected to be sent to the display device based, at least in part, on a value of the search terms for searching for information within a corpus of documents. Suggested search terms can be selected to be sent to the display device based, at least in part, on a frequency, in the recognized words, of the word(s) upon which the suggested search terms are based. Suggested search terms can be selected to be sent to the display device based, at least in part, on an inverse of a frequency of the search terms in a corpus of documents. Suggested search terms can be selected to be sent to the display device based, at least in part, on whether or not the search terms are proper nouns.

Sending the suggested search terms to the display device for display to a user in a text format can include sending the suggested search terms for display in a hypertext format, such that the user may select one or more of the displayed suggested search terms to formulate a search query. Sending the suggested search terms for display in the hypertext format can include sending the suggested search terms for display on a touchscreen in a format such that the user may select a displayed suggested search terms to formulate a search query by tapping on the displayed suggested search terms.

The electronic representation of the one or more human voices can be generated by a mobile computing device, and receiving the electronic representation of the one or more human voices can include receiving the electronic representation at a server computer, and recognizing the words in the electronic representation can include recognizing the words through operation of a voice recognition operation performed at the server computer. Sending the suggested search terms to a display device for display to a user in a text format can include sending the suggested search terms for display in a format in which a first text format that can include indicia used to convey a significance of a displayed suggested search term for use as a query term. Sending the suggested search terms to a display device for display to a user in a text format can include sending the suggested search terms for display in a format in which a first text format that can include indicia used to convey when a word in the suggested search term was uttered by the one or more human voices.

A search query can be received from the user at a server computing device, where the search query includes at least one of the suggested search terms. The search query can be executed results of the executed query can be returned to the user.

Words in a second portion of the electronic representation of the one or more human voices can be recognized, where the second portion is different from the first portion, and suggested search terms can be sent to a display device for display to a user in a text format, where the suggested search terms are based on the recognized words in the second portion of the electronic representation of the one or more human voices. The first portion and the second portion can have a duration of a predetermined time period. The first portion and the second portion can include a predetermined number of recognized words. The duration of the predetermined time period and/or the predetermined number of recognized words can be based on input from the user. The first portion can have a duration from a first time to a second time, and the second portion can a duration from third time to a fourth time, the third time being after the first time and before the second time.

Words can be recognized in a series of different portions of the electronic representation of the one or more human voices, and a series of groups of suggested search terms can be sent to a display device for display to a user in a text format, where the groups of suggested search terms are based the recognized words in the different portions of the electronic representation of the one or more human voices.

In another general aspect, a computing system includes a microphone configured to generate an electronic representation of one or more human voices, a transmitter configured to transmit a first portion of the electronic representation of the one or more human voices to a server computing system, and a receiver configured to receive suggested search terms from the server computing device, where the suggested search terms are based on the words recognized through a voice recognition operation performed at the server computing system in the first portion of the electronic representation of the one or more human voices. The computing system also includes a display device configured to display the suggested search query terms to a user in a text format and a user input interface engine configured for receiving, from the user, a search query that can include one or more of the suggested search terms that were displayed to the user.

Implementations can include one or more of the following features. For example, the electronic representation of the one or more human voices can include an audio file. The user input interface engine can be further configured for receiving an indication from the user that the first portion of the electronic representation begins at a first time of the audio file and ends a second time of the audio file. The first portion of the electronic representation of the one or more human voices can include a portion of a continuous stream of audio data. The suggested search terms received from the server computing device can be based, at least in part, on a value of the search terms for searching for information within a corpus of documents. The suggested search terms received from the server computing device can be based, at least in part, on a frequency, in the recognized words, of the word(s) upon which the suggested search terms are based. The suggested search terms received from the server computing device can be based, at least in part, on an inverse of a frequency of the search terms in a corpus of documents. The suggested search terms received from the server computing device can be based, at least in part, on whether or not the search terms are proper nouns.

The text format can include a hypertext format, such that the user may select one or more of the displayed suggested search terms to formulate a search query. The display can include a touchscreen through which the user may select a suggested search term displayed in a hypertext format to formulate a search query by tapping on the displayed suggested search term. The display can be configured to display suggested search terms in a first text format that can include indicia used to convey a significance of a displayed suggested search term for use as a query term. The display can be configured to display suggested search terms in a first text format that can include indicia used to convey when a word in the suggested search term was uttered by the one or more human voices. The transmitter can be further configured to transmit to the server computing system a search query that can include at least one of the suggested search terms.

In another implementation, a server computing system includes a receiver configured to receive an electronic representation of one or more human voices, a voice recognition engine configured to recognize words in a first portion of the electronic representation of the one or more human voices, and a query term generation engine configured to generate suggested search query terms based on the recognized words in the first portion of the electronic representation of the one or more human voices. The system also includes a transmitter configured to send the suggested search terms to a client computing device for display to a user in a text format on a display device and a query execution engine configured to receive, from the user, a search query that can include one or more of the suggested search terms that were displayed to the user and to query a database for information matching the search query terms received from the user.

Implementations can include one or more of the following features. For example, the electronic representation of the one or more human voices can include an audio file. The first portion of the electronic representation of the one or more human voices can include a portion of a continuous stream of audio data. The suggested search terms that are generated and transmitted to the client computing device can be based, at least in part, on a value of the search terms for searching for information within a corpus of documents. The suggested search terms that are generated and transmitted to the client computing device can be based, at least in part, on a frequency, in the recognized words, of the word(s) upon which the suggested search terms are based. The suggested search terms that are generated and transmitted to the client computing device can be based, at least in part, on an inverse of a frequency of the search terms in a corpus of documents. The suggested search terms that are generated and transmitted to the client computing device can be based, at least in part, on whether or not the search terms are proper nouns.

The system can also include a storage medium configured to store an index of a corpus of documents, and the query execution engine can be configured to query the index for information matching the search query terms received from the user.

The details of one or more implementations are set forth in the accompanying drawings and the description below. Other features will be apparent from the description and drawings, and from the claims.

BRIEF DESCRIPTION OF THE DRAWINGS

FIG. 3 shows the text of a hypothetical conversation between three people.

FIG. 4 shows exemplary textual data output from a voice recognition engine based on the conversation shown in FIG. 3.

Like reference numerals may refer to the same component throughout the figures.

DETAILED DESCRIPTION

As described herein, the speech of one or more people can be automatically monitored, so that relevant terms for search queries can be automatically generated and presented to the one or more people, either as they are talking or after their conversation. The speech can be converted into an electronic representation of the human voices that are speaking, words can be recognized from the electronic representation, and suggested search terms can be generated based on the recognized words. For example, a mobile device may be used to monitor the speech and to generate the electronic representation. The electronic representation can be sent to a remote computing device that performs speech recognition to recognize words in the electronic representation and that then generates the suggested search terms. Then, the remote device can send the suggested search terms to the people, who then can select one or more terms for use in a search query.

Figure 1:
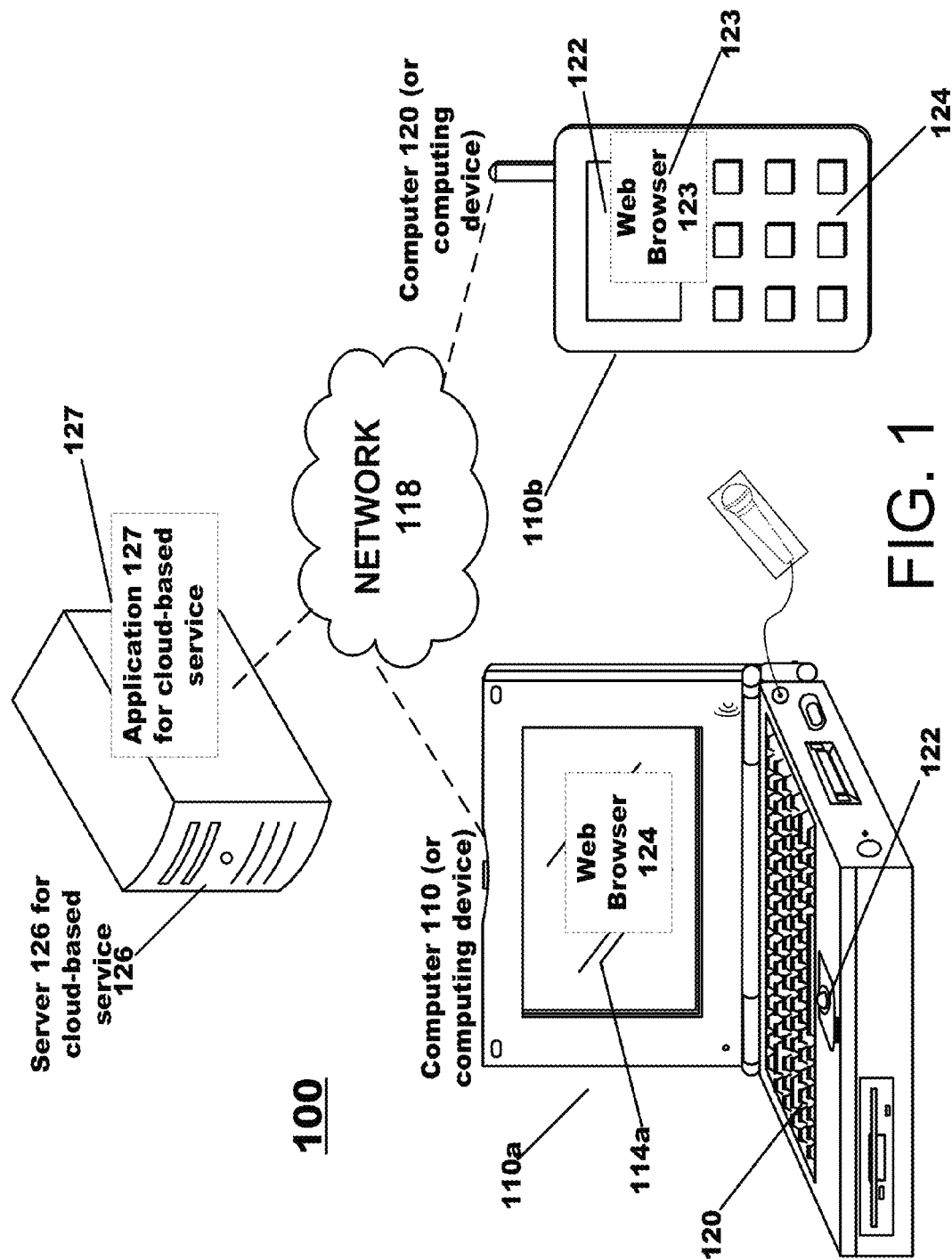
FIG. 1 is a block diagram of a system that may include a variety of computing devices connected via a network to a remote server computer.

FIG. 1 is a block diagram of a system 100 that may include a variety of computing devices 110a, 110b, connected via a network 118 to a remote server computer 126. By way of example, the computing devices 110a, 110b may include a personal computer (e.g., a desktop computer, a laptop, notebook, tablet computer, or netbook computer) or a mobile phone, smartphone, or personal digital assistant 110b. The computing devices 110a, 110b may include a microphone 112a, 112b for monitoring the voices of one or more voices of one or more humans. The microphone 112a, 112b can be integrated into the housing of the computing device 110a, 110b. For example, a microphone 112a can be built into a display housing 113a of computing device 110a or can be built into a main body housing 115a of the computing device 110a. A microphone 112b can be built into a housing 113b of the computing device 110b. In another implementation, the computing device can include a connector (e.g., a jack) 114a, 114b, for receiving input from an external microphone 116a, 116b that can be removably connected to the computing device 110a, 110b.

The computing device 110a, 110b can include a display 118, 118b for displaying information to a user. For example, the computing device 110a can include a display 118a within the display housing 113a of the device and that can be tilted up from the main body housing 115a of the device. In another implementation, the display 118a can be external to the main body housing 115a of the computing device. For example, the display 118a may include an external monitor or may include a projector for displaying information on a screen or wall to a user. Display 118a, 118b may be any type of display, and may include a capacitively- or resistively-coupled touchscreen, for example.

The computing devices 110a, 110b may include human input devices, such as, for example, a keyboard 120a, 120b, and a pointing device 122 (such as a track ball, mouse, touch pad, mouse, or other pointing device). Keyboard 120a, 120b may be any type of keyboard, such as a standard keyboard, or a touchscreen (or touch-sensitive display), as examples.

Although not shown in FIG. 1, each of computing devices 110a, 110b may include non-volatile memory (e.g., a hard disk or Flash memory) and volatile memory (e.g., random access memory ("RAM")) to store data and software/computer instructions, a processor for executing software/computer instructions and providing overall control to the computing devices 110a, 110b. Computing devices 110a, 110b may each include an operating system (OS) stored in memory and executed at startup, for example. Computing devices 110a, 110b may execute or run applications, such as a web browser 124, for example.

The computing devices 110a, 110b, can be connected to the server 126 through a network 118. Network 118 may include the Internet, a Local Area Network (LAN), a wireless network (such as a wireless LAN or WLAN), or other network, or a combination of networks. According to an example embodiment, server 126 (which may include a processor and memory) may run one or more applications, which may provide desired functionality to the computing devices 110a, 110b.

Figure 2:
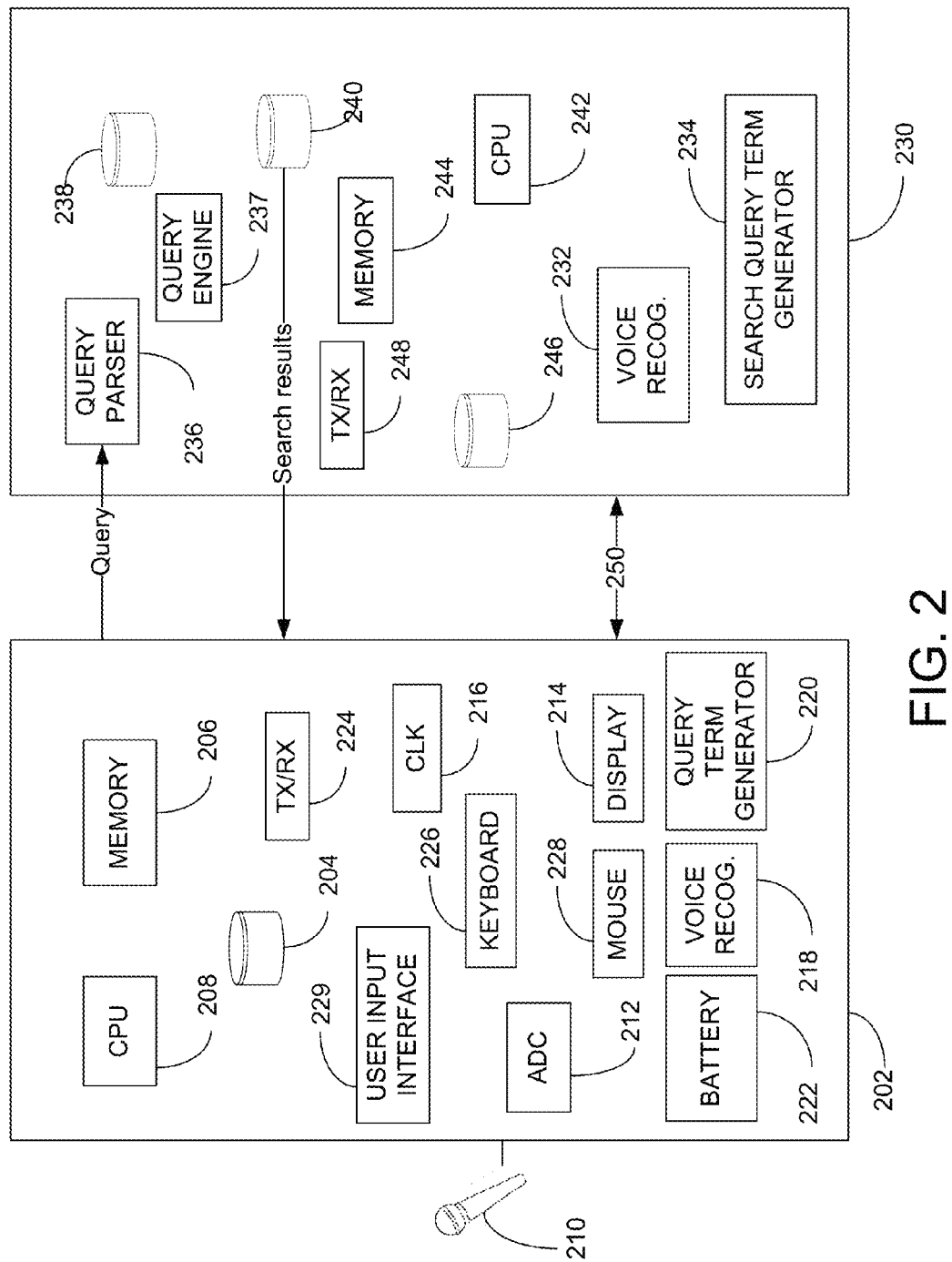
FIG. 2 is a schematic block diagram of a client computing device connected through a network to a server computing device.

FIG. 2 is a schematic block diagram of a client computing device 202 connected through a network 250 to a server computing device 230. In various implementations, the computing devices 110a and 110b may be implementations of the client computing device 202, and the server 126 may be an implementation of the server computing device 230. The client computing device can include a non-volatile memory configured for storing data and executable instructions 204, a volatile memory 206 configured for temporarily storing data and executable instructions, and a processor 208 configured for executing instructions. The client computing device 202 can include, or can be operably connected to, a microphone 210 that is configured for detecting human voices and for outputting an electronic representation of one or more human voices. When the output from the microphone is an analog representation of one or more human voices, the client 202 can include an analog-to-digital converter 212 that may receive the analog output from the microphone 210 and may convert the analog output into a digital electronic representation of the one or more human voices. The client computing device 202 can also receive an electronic representation of one or more human voices from another device and can forward that representation to the server computing system 230. For example, in the case of a mobile phone implementation of the client 202, can monitor the conversation between a local and a remote party by detecting the voice of the local party through a microphone 210 and by receiving audio data corresponding to the voice of the remote party from another device. The client computing device 202 then may forward an electronic representation of the conversation between the two parties to the server computing device 230.

The electronic representation of the one or more human voices that is generated, at least in part, by the microphone 210, whether it is an analog or digital representation, can be transmitted by a transmitter/receiver 224 through the network 250 to the server computing device 230. The transmission of the electronic representation of the one or more human voices can occur automatically or in response to instructions from a user entered into the client device 202. For example, the client computing device 202 may be configured, after an initial installation or setup procedure, to automatically transmit a continuous stream of audio data signals generated by the microphone 210 to the server computing device 230. For example, when the client computing device (e.g., a mobile device) includes an application for searching a corpus of documents (e.g., the world wide web) for information, opening and executing the application on the device may initiate the automatic transmission of a continuous stream of audio data signals generated by the microphone 210 to the server computing device 230. In another embodiment, the client computing device 202 may be configured to transmit, based on commands from a user, specific signals generated by the microphone 210 (e.g., substeams of audio data or audio files representing parts of a continuing conversation) to the server computing device 230. For example, the user may cause certain portions of a multi-person conversation, single-person dictation, or other audio signals (collectively a "conversation") to be transmitted to the server computing device 230. In one implementation, the client computing device 202 can include a clock 216 for continuously monitoring a relative or absolute time at which events occur and associating a time with the events. The user can use these times to select a portion of a series of audio signals for transmission to the server computing device 230 (e.g., a portion that has a duration of a certain absolute time, or that is defined to last a particular time after an initial time is defined, or that begins and ends at particular times). The user's selection of the times can be received by a user input interface engine 229.

Upon receipt of the electronic representation of the one or more human voices, the representation can be processed by a voice recognition engine 232 to convert spoken words within the electronic representation into text. The server computing device 230 can include a non-volatile memory configured for storing data and executable instructions 246, a volatile memory 244 configured for temporarily storing data and executable instructions, and a processor 242 configured for executing instructions. The voice recognition engine 232 can be implemented in hardware or software or a combination of the two and can be configured to receive information representing audio data (e.g., spoken words) and to output input representing textual data (e.g., words, phrases, and other alphanumeric information). The output of the voice recognition engine 232 can be passed to a search query term generator 234 that can analyze the textual output generated by the voice recognition engine 232 and, based on the generated textual output, can generate query terms that may be useful for a user when performing search query of a database of information. For example, the search query term generator 234 can receive the text of individual words from the output of the voice recognition engine 232 and, based on those words, can generate query terms that may include, for example, the exact words that are received from the voice recognition engine 232, words that are related through a shared stem to the individual words, synonyms of the individual words, and phrases that include a sequence of the individual words or synonyms of the words. Thus, the search query term generator 234 can generate query terms that are identical to the words output from the voice recognition engine 232 or that are abstracted from the output of the voice recognition engine.

Query terms can be transmitted by a transmitter/receiver 248 of the server computing device 230 over the network 250 to the client computing device 202, where they can be displayed to a user on a display 214. In various implementations the display 118*a* and 118*b* may be implementations of the display 214. A user can select one or more of the displayed query terms to formulate a query for information. After selecting one or more of the query terms, and perhaps adding one or more additional query terms that are not displayed in the display 214, the terms can be transmitted by the transmitter/receiver 224 to the server computing device 230 where they can be used to query a corpus of files for information. For example, the query terms can be received through a transmitter/receiver 248 of the server computing device 230 and then processed by a query parser 236 (also known as a query rewriter) that can pre-process the query before using the terms to query the corpus of files for selected information. The pre-processing can include, for example, stemming one or more query terms, grouping query terms into one or more multi-term phrases, providing synonyms of the query terms, etc. The query terms and/or the result of the pre-processed query terms then can be used to query a corpus of files for selected information corresponding to the query. For example, if the corpus of files is indexed and an index is stored in one or more storage devices 238 the query terms and/or the result of the pre-processed query terms can be compared to entries in the index 238, and then files corresponding to matching index entries can be retrieved from one or more storage devices 240 and provided through the network 250 to the user.

In another implementation, a voice recognition engine 218 and/or a query term generator 220 can be included in the client computing device 202. In such an implementation, the voice recognition engine 218 on the client device 202 can receive the electronic representation of the one or more human voices, and the representation can be processed by the voice recognition engine 218 to convert spoken words within the electronic representation into text. Similarly, the query term generator 220 can analyze the textual output generated by the voice recognition engine 232 or 218 and, based on the generated textual output, can generate query terms that may be useful for a user when performing search query of a database of information.

FIG. 3 shows the text of a hypothetical conversation 300 between three people—"Person 1'; "Person 2"; and "Person 3." As shown in bold font of FIG. 3, the identity of the speaker and the relative time at which the speaker begins speaking (in minutes and seconds) is shown. In addition, the statement spoken by the speaker is shown in unbolded font. In the hypothetical conversation in FIG. 3, various topics, such as, vacationing in Brazil, Iguazu Falls, exploration of South America, European explorers, and portrayal of Iguazu Falls in Hollywood films are discussed. Thus, participants in the conversation, or people listening to the conversation, may be interested in searching for more information about such topics or related topics.

In some implementations, the electronic representation of the human voices participating in the conversation 300 can be transmitted continuously from the client computing device 202 to the server computing device 230 for processing by the voice recognition engine 232. In other implementations, portions of the electronic representation of the human voices participating in the conversation 300 can be buffered temporarily in memory 206 or 204 of the client computing device 202 and then transmitted (e.g., in a compressed format) to the server computing device 230 for processing by the voice recognition engine 232. By transmitting buffered portions of the electronic representation from the client device 202 to the server device 230 and or using a compressed format for transmission of the portion, rather than continuously streaming audio data, the energy of a battery 222 that may power the client device 202 may be conserved. This may be preferable in implementations in which the client device 202 is a battery-powered mobile device that transmits the electronic representation of the voices of the conversation 300 over a network 250 that may include a wireless link.

FIG. 4 shows exemplary textual data output 400 from a voice recognition engine based on the conversation shown in FIG. 3. For example, an electronic representation of the one or more human voices of the participants in the conversation can be transmitted to a voice recognition engine 232 or 218, and the representation can be processed by the voice recognition engine 232 or 218 to convert spoken words within the electronic representation into text. The output of the voice recognition engine 234 or 218 can be a formatted or unformatted series of text output (e.g. words) corresponding to the words spoken by the participants of the conversation shown in FIG. 3. FIG. 4 shows the textual output as an unpunctuated and uncapitalized series of text words.

Figure 5:
FIG. 5 is an exemplary table of search query terms that can be provided to a user based on the conversation shown in FIG. 3.

FIG. 5 is an exemplary table 500 of search query terms that can be provided to a user based on the conversation shown in FIG. 3. For example, search query terms in the table of FIG. 5 can be generated by the query term generator 234 or 220 based on the text output from the voice recognition engine 218 or 232. In contrast to the unformatted text shown in FIG. 4, the query terms shown in the table of FIG. 5 can be capitalized when appropriate (e.g., for proper nouns). In addition, the terms shown in table 500 are not always single word terms, because search query terms sometimes are formed from multiple words. For example, table 500 lists the query terms "Iguazu Falls," "Niagara Falls," "Indiana Jones," "exploration of South America," and "James Bond," among other multiword terms. Multiword search query terms can be useful for locating documents or files of information that be indexed by, and that therefore can be queried by, multiword query terms, as described, for example, in U.S. Pat. No. 7,580,921, issued on Aug. 25, 2009, and entitled "Phrase Identification in an Information Retrieval System," U.S. Pat. No. 7,536,408, issued on May 19, 2009, and entitled "Phrase-Based Indexing in an Information Retrieval System," and U.S. Pat. No. 7,599,914, issued on Oct. 6, 2009, and entitled "Phrase-Based Searching in an Information Retrieval System," each of which is incorporated by reference herein. In addition, the search query terms shown in table 500 may omit words or terms from the output of the voice recognition engine 218 or 232 that are of little value as search query terms (e.g., "I," "you," "to," "for," "the," "a" "it"). After search query terms, such as those shown in table 500, have been generated by query term generator 220 or 234 one or more of the generated terms can displayed to a user as suggested terms that the user may select to perform a query for information from a corpus of files.

Figure 6:
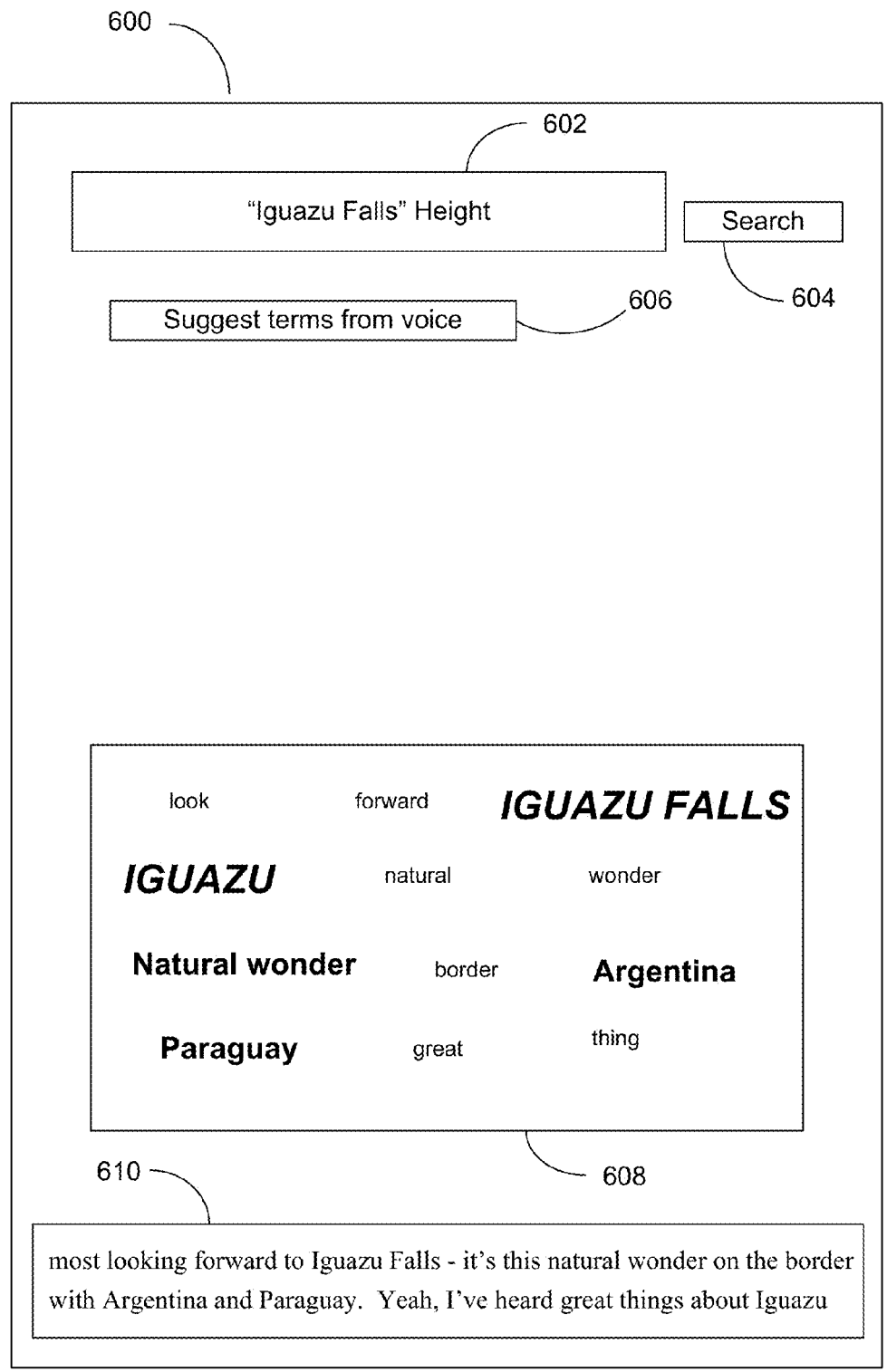
FIG. 6 is an exemplary illustration of a user interface in which some or all of the search query terms of FIG. 5 can be presented to a user.

FIG. 6 is an exemplary illustration of a user interface ("UI") 600 in which some or all of the search query terms from table 500 can be presented to a user. The user interface can be presented to the user by the display 214. The user interface 600 can be part of a native browser application or can be part or an applet, Java app, or plug-in that is executed by a browser. A user can input query terms in a search query box 602 and can submit a query for information based on the query terms entered in the query box 602 by selecting a user interface element (e.g., a button) 604. The user interface 600 can include a user interface element 606 with which a user can activate the generation of suggested search query terms based on the spoken words. When the user interface element 606 is selected (e.g., by clicking on the element), then search terms can be suggested to the user based on the words spoken by voices detected by the client device 202. In some implantations, selection of the element 606 can activate the detection and monitoring of voices by the device, and/or can monitor the buffering of audio signals corresponding to the monitored voices (e.g., buffering of the signals in the memory 206 or 204), and/or can activate the transmission of an electronic representation of the voices to the server computing device 230, and/or can activate processing by the voice recognition engine 232 or 218 to convert spoken words within the electronic representation into text, and/or can activate generation of the search query terms based on the conversation. In other implementations, such actions may already be running in background and selection of the element 606 may activate fewer than all of the above-mentioned actions.

As stated above, selecting the user interface element 606 can activate the presentation of suggested search query terms based on spoken text. In addition, spoken works that are recognized by the voice recognition engine 218 or 232 can be presented to the user in a user interface element 610. For example, user interface element 610 may display the words that are spoken in near real time. In one implementation, user interface element 610 may display a predefined number of lines of text (two lines of text are shown in the UI element 610 of FIG. 6) and when all the lines are filled, then the oldest line of text can be deleted, the other lines can moved up by one line width, and a new line of text can start displaying the most recently spoken words. In another implementation, UI element 610 can display the words that are spoken in a predefined time period (e.g., 10 seconds, one minute, 5 minutes, etc.), which may be determined based on input from a user. Thus, a user may specify that UI element 610 display groups of words that are spoken in different predefined time periods, and UI element 608 can display different groups of suggested search query terms that correspond to the different groups of words. In another implementation, UI element 610 can display a predefined number of words, and the number may be determined based on input from a user.

The suggested query terms that are generated based on the text words recognized by the voice recognition engine 218 or 232 can be presented within a user interface element 608. In one implementation, the suggested query terms presented in UI element 608 can include all the words that are recognized by the voice recognition engine 218 or 232. In another implementation, the UI element 608 can display all, or a subset of, the search query terms generated by the query term generator 220 or 234 in response to the text input received from the voice recognition engine 218 or 232. For example, all the search query terms in table 500 corresponding to the text displayed in UI element 610 can be displayed in UI element 608. Thus, as shown in FIG. 6, the query term "look" can be displayed in UI element 608 because the query term "look" corresponds to, and is a stem of, the word "looking" from the conversation 300, even though the exact word "look" was not spoken in the conversation 300. Similarly, the multiword query term "Natural wonder" can be displayed in the UI element 608 in addition to the query terms "natural" and "wonder."

Synonyms and words and phrases that are related to words and phrases used in the conversation and recognized by the voice recognition engine 218 or 232 also can be generated by the query term generator 220 or 234 for display in UI element 610. For example, query term generator 220 or 234 can generate the query term "holiday" as a synonym for "vacation" for display in UI element 610. Also, as described in U.S. Pat. No. 7,599,914, issued on Oct. 6, 2009, and entitled "Phrase-Based Searching in an Information Retrieval System," which is incorporated by reference herein, the query term generator 220 or 234 can generate the query terms that are related to phrases generated based on the text output from the voice recognition engine 218 or 232. For example, in a conversation that uses the phrase "Monica Lewinsky," the query term generator 220 or 234 could suggest the query term "Bill Clinton" in UI element 608, because the phrases "Bill Clinton" and "Monica Lewinsky" are related, even though the term "Bill Clinton" may not appear in the conversation.

In another implementation, search query terms corresponding to text of the conversation 300 that is not displayed in UI element 610 also can be displayed in UI element 608. For example, if UI element 610 is not used or if UI element 610 displays only one line of text at a time, UI element 608 may nevertheless display query terms corresponding to two or more lines of text or that correspond to two or more lines of the conversation 300.

In another implementation, a subset of the search query terms corresponding to words spoken in the conversation 300 can be displayed in UI element 610. The query terms in the subset selected for display in UI element 608 can be based on their intrinsic value as search terms, where the value of the search term may be determined according to a number of factors (e.g., how frequently the term appears in a corpus of documents, whether the term is a proper noun, whether the term is related to a geographic location, whether the term is related to another term that is displayed, where relations can be measured according to techniques described in "Phrase Identification in an Information Retrieval System," U.S. Pat. No. 7,536,408, issued on May 19, 2009). For example, query terms in table 500 such as "go" and "do" may have relatively low intrinsic value as search query terms, because they appear very frequently in a corpus of documents to be searched (e.g., documents accessible through the Internet) and therefore offer relatively little value for isolating a document relevant to a search. Because of the low value as a search term these terms therefore may not be included in the query terms that are displayed in UI element 608. In contrast, a term such as "Iguazu Falls" may have a very high relative value as a search term because it is a proper noun, identifies a geographic location, and may be used relatively infrequently in a corpus of files or documents available through the Internet, so it may be concluded that the term will be used to point to a very specific set of documents in the corpus.

The suggested search query terms in UI element 608 can be displayed differently according to different criteria. For example, search query terms that are deemed to be relatively more valuable for locating information in a corpus of files can be displayed in a relatively large, bold, capitalized, or italicized font, while search query terms that are deemed to be relatively less valuable for locating information in the corpus of files can be displayed in a relatively small, normal, or lower case font. Thus, for example, "Iguazu Falls" and "Iguazu" and shown in large, bold, capitalized, and italicized font, while the terms "look," "forward," "natural," "wonder," "border," "great," and "thing" are displayed in small, unbold, lower case font. Terms with intermediate value for locating information, such as "natural wonder," "Argentina," and "Paraguay" can be displayed in intermediate size, bold, lower case font.

In another implementation, the terms can be displayed differently according to their relative importance in the conversation that is being monitored. For example, terms that are generated frequently based on the conversation 300 can be displayed more prominently than terms that are generated only once or relatively infrequently to indicate the relative importance of different topics of the conversation. Thus, for example, the terms "Iguazu" and "da Gama" may be displayed more prominently than the terms "Paraguay" and "Argentina" because the "Iguazu" and "da Gama" are used more often in the conversation 300 that the terms "Paraguay" and "Argentina."

In another implementation, the terms can be displayed differently according to the time at which the word(s) upon which they are based were spoken. For example, suggested search query terms displayed in UI element 608 that are spoken more recently can be displayed more prominently than terms that were spoken longer ago in the past.

Suggested search terms that are displayed differently according to their relative importance can be grouped according to their relative importance. For example, FIG. 6 shows three groups of query terms that are displayed, respectively, in large, bold, capitalized, and italicized font (the highest importance group), in small, unbold, lower case font (the lowest importance group), and in intermediate size, bold, lower case font (the intermediate importance group). Other indicia of importance (e.g., color, animation, font type, etc.) also can be used to display the relative importance of the groups of query terms.

Once the search terms have been grouped according to their perceived importance, the different groups can be manipulated within the UI element 608 as a whole. For example, a user may select and drag a term in one group within the UI element 608, and the dragging operation may drag the other terms in the group in the same direction and by the same amount with the UI element 608. In another example, terms in a second group can be dragged also when a term in a first group is selected and dragged. For example, if the term "Iguazu" is selected and dragged in UI element 608, may cause terms in the medium importance group as well as terms in the high importance group to be dragged along with the term "Iguazu" within the UI element 608. In one implementation, the terms in different groups can be dragged my different amounts to highlight that they belong to different groups. For example, if the term "Iguazu" is selected and dragged in UI element 608 by X amount, other terms in the high importance group also may be dragged by X amount with the term "Iguazu," but terms in the medium importance group may be dragged by only X/2 amount, and terms of low importance may not be dragged at all. When the UI element 608 is crowded with many terms, which may overlap, dragging different groups of terms collectively by different amounts allows a user to quickly and easily move some terms out of the way of other terms to expose terms that may be initially obscured.

As the conversation 300 progresses, the suggested search query terms displayed in UI element 608 can change. For example, as the text recognized by voice recognition engine 218 or 232, which may appear in UI element 610, evolves to reflect different topics discussed in the conversation 300, the suggested search query terms presented in UI element 608 can change. In one implementation, suggested query terms that correspond to more recent topics of the conversation 300 can be displayed at the top of the UI element 608, while suggested query terms that correspond to older topics of the conversation 300 can be displayed at the bottom of the UI element 608. Then, as the conversation proceeds and suggested query terms evolve to correspond to older topics of the conversation they can be moved toward the bottom of the UI element 608.

In another implementation, the suggested query terms can be presented in different fonts, type size, colors, etc. to reflect their relevance to the conversation 300, and the indicia of a query term's relevance may change as the conversation evolves. The relevance of a query term to the conversation may be determined, for example, based on the relevance to the entire conversation since monitoring of the conversation began or to a portion of the conversation (e.g., the most recent portion of the conversation). Thus, a conversation 300 that begins with a discussion of Iguazu Falls and then evolves into a discussion of $16^{th}$ century European explorers may initially display the query term "Iguazu Falls" very prominently (e.g., in large, bold, italic font) but then may display that term less prominently (e.g., in small, unbold, non-italic font) when the conversation is no longer concerned with Iguazu Falls. Eventually, the term may be omitted altogether from the UI element 608 when its relevance to the portion of the conversation is sufficiently low. This implementation may be used instead of, or as a complement to implementations in which the position of a query term in UI element 608 is used to represent whether the query term corresponds to an older or a newer topic of the conversation.

A user may select suggested search terms displayed in the UI element 608 to formulate a search query. The user may select suggested search terms using one or more user interface devices, such as a keyboard 226, a mouse, and the display 214, with which the user may interact with the client computing device 202. The input from a user interface device can be received by a user input interface engine 229, which can convert signals from the operation of one or more user interface devices into a signals indicating the user's selection of one or more suggested query terms. In one implementation, the user input interface engine 229 can include or receive input from search query box 602. For example, the suggested search query terms can be displayed on the display 214 in a hypertext format, such that the user may select one or more of the displayed suggested search terms to formulate a search query. For example, the user may selected a term displayed in the UI element 608 by clicking on a pointing device (e.g., a mouse 228) after navigating a cursor over the term or, when the UI 600 is displayed on a touchscreen display, by double tapping with a finger or a stylus on the term. The selected term then can be displayed in the search query box 602. The user can also add additional query terms that do not appear in the UI element 608 to the search query box 602, e.g., by typing the additional term(s) into the search query box 602. The query that includes all the terms displayed in the search query box 602 can be transmitted to the server computing device 230 for execution, for example, by the user selecting the "search" user interface element 604. Execution of the search query can involve a query execution engine 237 that queries a database (e.g., an indexed database 238) for information matching the search query terms.

Search results (e.g., hyperlinks to content that is stored in a memory device (e.g., memory 240), along with a summary of the content) received from the server computing device 230 in response to execution of the query can be displayed in the UI 600. In one implementation, the search results can be displayed between the search query box 602 and the UI element 608. In another implementation, when search results are received from the server computing device 230, the UI elements 608 and/or 610 can be omitted from the UI 600, to provide more room in the UI 600 for the display of the search results beneath the search query box 602. Then, when the user wishes to resume the display of automatically generated suggested search terms, the user may select the UI element 606 to remove the search results from the UI 600 and to return the UI element 608 (and UI element 610) to the UI 600. Omitting the UI elements 608 and 610 when search results are displayed to the user may be preferable for small displays, such as displays on mobile and/or handheld devices, such as mobile phones.

Figure 7:
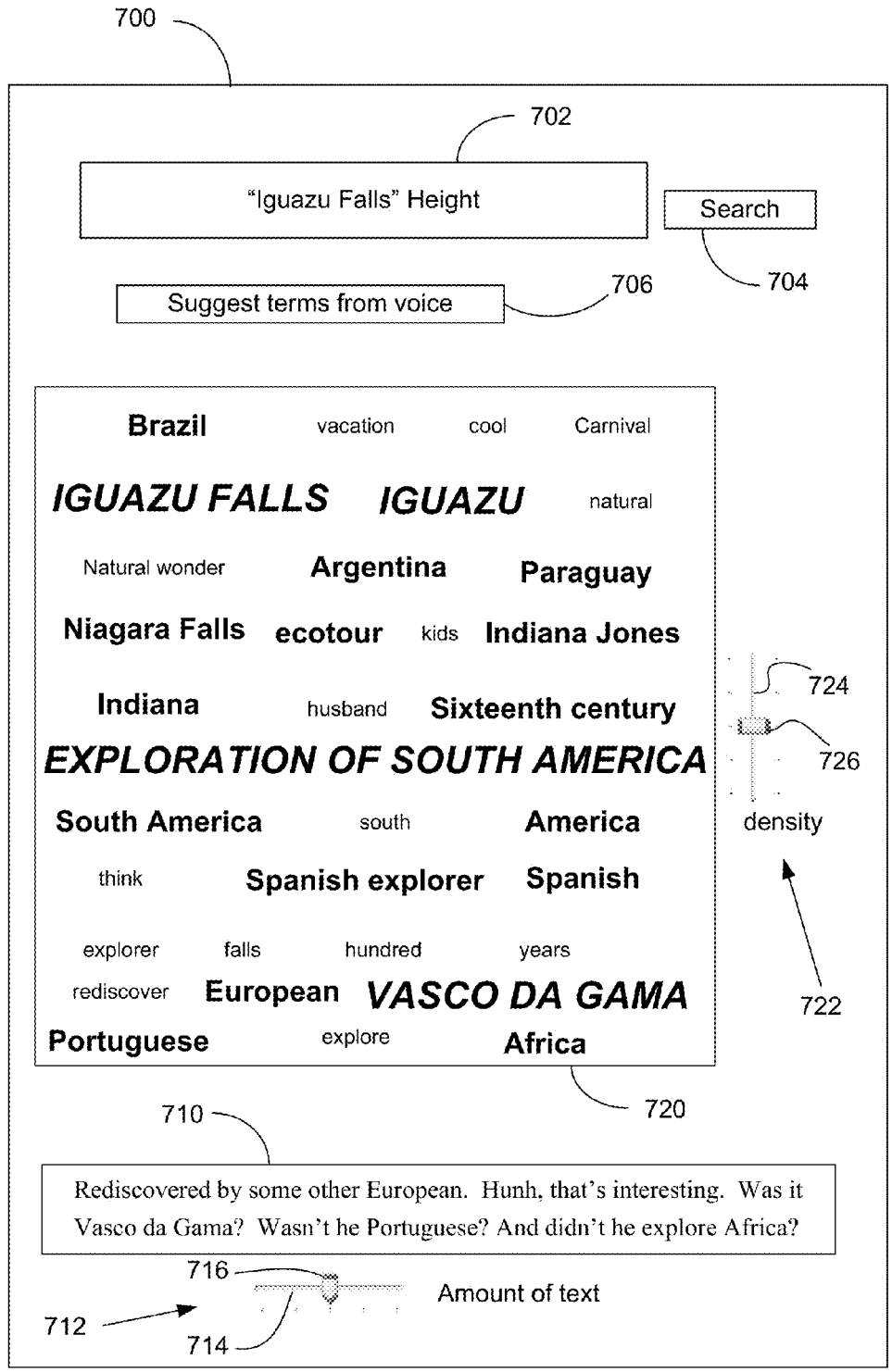
FIG. 7 is another exemplary illustration of a user interface in which some or all of the search query terms of FIG. 5 can be presented to a user.

FIG. 7 is another exemplary illustration of a UI 700 in which some or all of the search query terms from table 500 can be presented to a user. The UI 700 can be presented to the user by the display 214. The UI 700 can be part of a native browser application or can be part or an applet, Java app, or plug-in that is executed by a browser. A user can input query terms in a search query box 702 and can submit a query for information based on the query terms entered in the query box 702 by selecting a user interface element (e.g., a button) 704. The user interface 700 can include a user interface element 706 with which a user can activate the generation of suggested search query terms based on the spoken words. When the user interface element 706 is selected (e.g., by clicking on the element), then search terms can be suggested to the user based on the words spoken by voices detected by the client device 202. In some implantations, selection of the element 706 can activate the detection and monitoring of voices by the device, and/or can monitor the buffering of audio signals corresponding to the monitored voices (e.g., buffering of the signals in the memory 206 or 204), and/or can activate the transmission of an electronic representation of the voices to the server computing device 230, and/or can activate processing by the voice recognition engine 232 or 218 to convert spoken words within the electronic representation into text, and/or can activate generation of the search query terms based on the conversation. In other implementations, such actions may already be running in background and selection of the element 706 may activate fewer than all of the above-mentioned actions.

Spoken works that are recognized by the voice recognition engine 218 or 232 can be presented to the user in a user interface element 710. For example, user interface element 710 may display the words that are spoken in near real time. In one implementation, user interface element 710 may display a predefined number of lines of text (two lines of text are shown in the UI element 710 of FIG. 7) and when all the lines are filled, then the oldest line of text can be deleted, the other lines can moved up by one line width, and a new line of text can start displaying the most recently spoken words.

In another implementation, a UI element 712 can be used to select a desired amount or portion of the conversation to display in UI element 710 and/or to convert into text from which search query terms can be generated and displayed in UI element 720. In an example implementation, UI element 712 can include a axis 714 across which a sliding element 716 can be moved, and the amount of text displayed in UI element 710 and/or the amount of text from which search query terms are generated and displayed in UI element 720 can depend on the position of the sliding element 716 on the axis 714. For example, when the sliding element 714 is positioned to the far left on the axis 716 a low number of words (e.g., the ten most recent words spoken) can be displayed in the UI element 710 and/or used to generate search query terms that are displayed in UI element 720, and when the sliding element 714 is positioned to the far right on the axis 716 a high number of words (e.g., the most recent 500 words spoken) can be displayed in the UI element 710 and/or used to generate search query terms that are displayed in UI element 720.

In another implementation, when signals corresponding to the conversation are buffered in the memory 206 and/or 204, two sliding elements 716 can be displayed on the axis 714 and used to select the beginning and the end of a portion of the conversation to use to generate search query terms for display in UI element 720. For example, the position of the sliding element on the left can indicate the beginning of the portion of the conversation to consider, and the position of the sliding element to the right can indicate the end of the portion of the conversation to consider. By using the two sliding elements in this manner, a user can select different parts of a conversation to use for the generation of suggested search query terms. Thus, a user may use the UI element 712 to "rewind" the electronic representation of the conversation, such that the voice recognition engine 218 or 232 can be used on an earlier portion of the conversation. In addition, the distance between the left and right sliding elements 716 on the axis 714 can determine the size of the conversation portion that is considered. Using the UI element 712 to rewind the conversation can allow a user to recall what was discussed during that earlier portion of the conversation (by observing the displayed suggested search query terms in UI element 720 as a function of the position of the sliding elements 716 on the axis 714) and also to suggest query terms based on a particular portion of the conversation. Positioning the right-hand sliding element to the far right of the axis 714 can indicate that the portion of the conversation to consider should include the most recently spoken words of the conversation.

UI 700 also can include a UI element 722 with which the density of suggested query terms displayed in UI element 720 can be displayed. In one implementation, UI element can include an axis 724 and a sliding element 726 that can be moved along the axis 724. When the sliding element 726 is positioned at one end of the axis 724 each text word that is recognized from the portion of the conversation that is to be considered (as determined, for example, by UI element 712) can be displayed as a suggested query term in UI element 720. When the sliding element 726 is positioned at the opposite end of the axis 724, a sparse subset of query terms based on the words recognized by the voice recognition engine 218 or 232 can be displayed in the UI element 720. For example, when the sliding element 726 is positioned at the opposite end of the axis 724, only a few terms that are deemed to have the highest intrinsic value as search query terms and/or that are deemed to be the most relevant to the topic(s) of the conversation may be displayed in UI element 720. When the sliding element 726 is positioned between the extreme ends of the axis 724, an intermediate number of terms may be displayed in the UI element 720. Thus, with the UI element 722 a user can choose whether to display a great number of suggested query terms in UI element 720 (e.g., for completeness) or to display only a few suggested query terms (e.g., to gain a high-level view of the most important and relevant topics of the conversation and/or the highest value search query terms).

Figure 8:
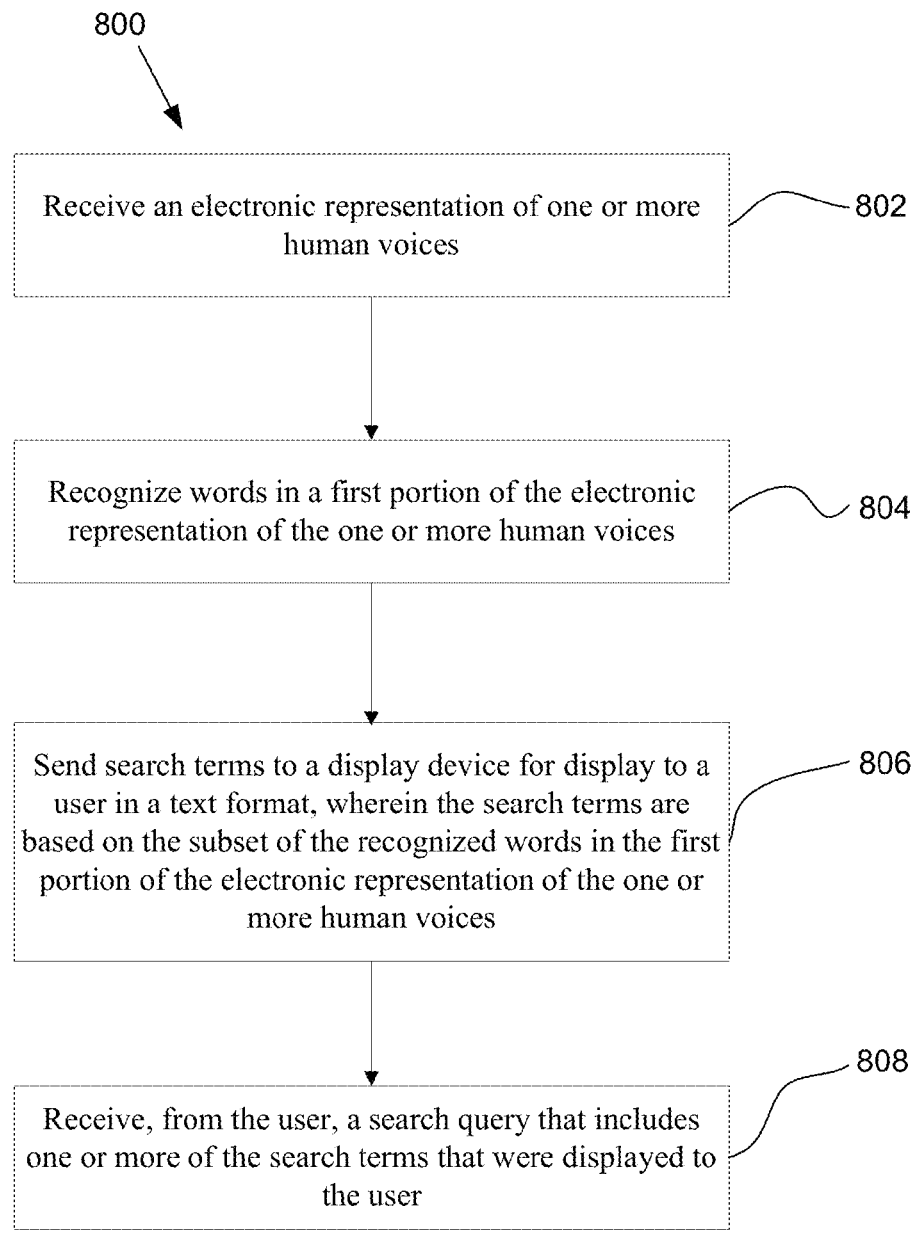
FIG. 8 is an exemplary flowchart illustrating example operations related to automatic generation of suggested query terms from voice recognized text.

FIG. 8 is an exemplary flowchart 800 illustrating example operations related to automatic generation of suggested query terms from voice recognized text. An electronic representation of one or more human voices is received (802), and words in a first portion of the electronic representation of the one or more human voices are recognized (804). Suggested search terms are sent to a display device for display to a user in a text format, where the search terms are based on the recognized words in the first portion of the electronic representation of the one or more human voices (806). A search query that includes one or more of the search terms that were displayed to the user is then received from a user (808).

These operations all can be performed on the server computing device 230, or the client computing device 202, or on a combination of the client and the server computing devices. For example, in one implementation the client computing device 202 can include a microphone 210 and/or ADC 212 from which the electronic representation can be received, and in another implementation the server computing device 230 can receive the electronic representation that is transmitted over a network 250. Words in the first portion of the electronic representation can be recognized by a voice recognition engine 218 or 232 that is included in the client computing device or on the server computing device, respectively. Suggested search query terms can be sent from a query terms generator 220 or 234 that is included in the client computing device or on the server computing device, respectively. The search query that includes one or more of the suggested search query terms can be received by the client computing device 202 (e.g., when a user inputs the terms via the display 214 or a keyboard interface to the device) or can received at the server computing device 230 when the query terms are transmitted through the network 250 from the client device 202 to the server device 230.

Figure 9:
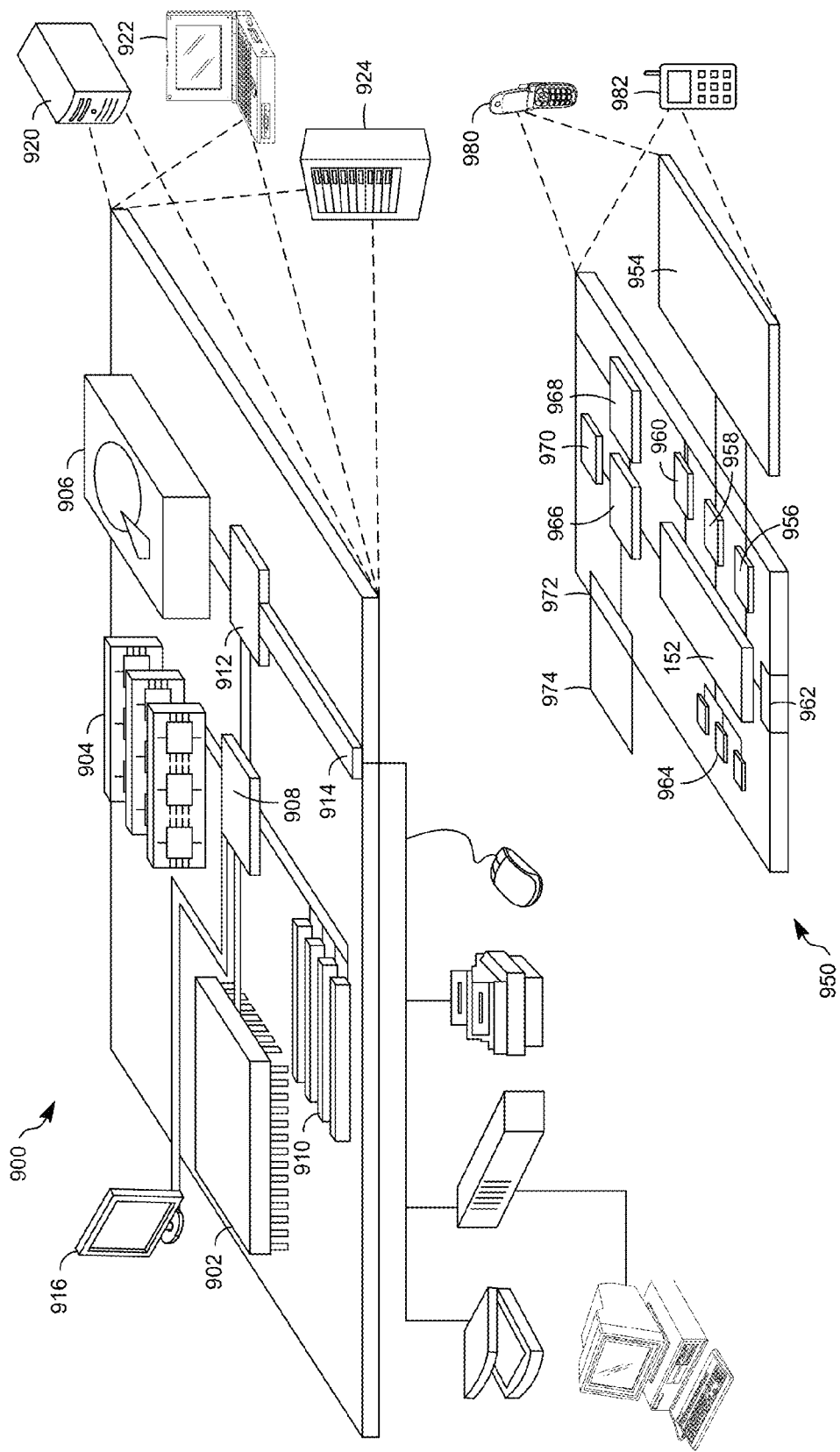
FIG. 9 is a block diagram of an example of a computer device and a mobile computer device that can be used to implement the techniques described herein.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network).

Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   receiving an electronic representation of a conversation between a plurality of human voices;
   recognizing one or more words in a first portion of the electronic representation of the conversation;
   recognizing one or more words in a second portion of the electronic representation of the conversation, wherein the second portion is different from the first portion, wherein the first portion has a duration from a first time to a second time, and wherein the second portion has a duration from a third time to a fourth time, the third time being after the first time and before the second time;
   selecting search terms for a search query, wherein the search terms include:
      at least one word from the one or more recognized words in the first portion that is selected as a search term based on whether the word is a proper noun, based on an inverse of a frequency of the word in a corpus of documents, and based on a number of times that the word is recognized in the first portion of the electronic representation of the conversation,
      at least one word that was not spoken in the conversation and is related to a word that was spoken in the conversation, and
      one or more words recognized in the second portion of the electronic representation of the conversation;
   causing the search terms to be displayed on a display device in a text format;
   receiving a search query that includes at least one of the search terms.

2. The method of claim 1, wherein the electronic representation of the conversation includes an audio file.

3. The method of claim 2, further comprising receiving an indication that the first portion of the electronic representation of the conversation begins at a first time of the audio file and ends a second time of the audio file.

4. The method of claim 1, wherein the first portion of the electronic representation of the conversation includes a portion of a continuous stream of audio data.

5. The method of claim 1, wherein the search terms are displayed in a hypertext format to facilitate selection of the at least one of the search terms used to formulate the search query.

6. The method of claim 5, wherein the display device comprises a touchscreen, wherein the at least one of the search terms is selected to formulate the search query by tapping on the at least one of the search terms.

7. The method of claim 1,
   wherein the electronic representation of the conversation is generated by a mobile computing device,
   wherein receiving the electronic representation of the conversation includes receiving the electronic representation at a server computer, and
   wherein recognizing the one or more words in the electronic representation of the conversation includes recognizing the words through operation of a voice recognition operation performed at the server computer.

8. The method of claim 1, wherein the search terms are displayed in a format that includes indicia used to convey a significance of each search term.

9. The method of claim 8, wherein the indicia used to convey the significance comprises a size of the search term relative to other search terms.

10. The method of claim 1, further comprising sending to a server computing device the search query, the search query including at least one of the search terms.

11. The method of claim 10, further comprising receiving results based on the search query executed by the server computing device.

12. The method of claim 1, wherein the first portion and the second portion have a duration of a predetermined time period.

13. The method of claim 12, further comprising determining the duration of the predetermined time period based on input from an input interface.

14. The method of claim 1, wherein the first portion and the second portion include a predetermined number of recognized words.

15. The method of claim 14, further comprising determining the predetermined number of recognized words based on input from an input interface.

16. The method of claim 1, further comprising:
   recognizing words in a series of different portions of the electronic representation of the conversation, and
   causing the recognized words in the series of different portions to be displayed on the display device in near real time during the conversation.

17. The method of claim 1, wherein selecting the search terms for the search query is further based on whether the word was spoken more recently in the conversation.

18. The method of claim 1, wherein selecting the search terms for the search query is further based on a time at which the word was spoken in the conversation, wherein words spoken more recently are displayed more prominently on the display device.

19. A computing system, comprising:
   a microphone configured to facilitate generating an electronic representation of a conversation between a plurality of human voices;
   a transmitter configured to transmit, to a server computing system, a first portion of the electronic representation of the conversation between the plurality of human voices and a second portion of the electronic representation of the conversation, wherein the second portion is different from the first portion, wherein the first portion has a duration from a first time to a second time, and wherein the second portion has a duration from a third time to a fourth time, the third time being after the first time and before the second time;
   a receiver configured to receive search terms from the server computing device, wherein the search terms include:

one or more words recognized in the first portion of the electronic representation of the conversation based on whether the word is a proper noun, based on an inverse of a frequency of the word in a corpus of documents, and based on a number of times that the word is recognized in the first portion of electronic representation of the conversation,
one or more words that was not spoken in the conversation and is related to a word that was spoken in the conversation, and
one or more words recognized in the second portion of the electronic representation of the conversation;
a display device configured to display the search terms in a text format; and
an input interface configured for receiving a selection of at least one of the search terms displayed on the display device.

20. The system of claim 19, wherein the electronic representation of the conversation includes an audio file.

21. The system of claim 20, wherein the input interface is further configured for receiving an indication that the first portion of the electronic representation begins at a first time of the audio file and ends a second time of the audio file.

22. The system of claim 19, wherein the first portion of the electronic representation of the conversation includes a portion of a continuous stream of audio data.

23. The system of claim 19, wherein the text format includes a hypertext format to facilitate selection of the at least one of the search terms to formulate a search query.

24. The system of claim 23, wherein the display device includes a touchscreen allowing selection of the at least one of the search terms displayed in a hypertext format to formulate the search query by tapping on the search term.

25. The system of claim 19, wherein the display device is configured to display the search terms in a first text format that includes indicia used to convey a significance of a search term relative to the other search terms.

26. The system of claim 19, wherein the transmitter is further configured to transmit to the server computing system a search query that includes the selection of the at least one of the search terms.

27. A server computing system, comprising:
a receiver configured to receive an electronic representation of a conversation between a plurality of human voices;
a voice recognition engine configured to recognize one or more words in a first portion of the electronic representation of the conversation and one or more words in a second portion of the electronic representation of the conversation, wherein the second portion is different from the first portion, wherein the first portion has a duration from a first time to a second time, and wherein the second portion has a duration from a third time to a fourth time, the third time being after the first time and before the second time;
a query term generation engine configured to select search terms for a search query, wherein the search terms include:
at least one of the one or more recognized words in the first portion that is selected as a search term based on whether the word is a proper noun, based on an inverse of a frequency of the word in a corpus of documents, and based on a number of times that the word is recognized in the first portion of the electronic representation of the conversation,
at least one word that was not spoken in the conversation and is related to a word that was spoken in the conversation, and
one or more words recognized in the second portion of the electronic representation of the conversation;
a transmitter configured to transmit the search terms to a client computing device for display in a text format on a display device; and
a query execution engine configured to receive a search query from the client computing device that includes at least one of the search terms that were displayed on the display device and to query a database for information matching the search query.

28. The server computing system of claim 27, wherein the electronic representation of the conversation includes an audio file.

29. The server computing system of claim 27, wherein the first portion of the electronic representation of the conversation includes a portion of a continuous stream of audio data.

30. The server computing system of claim 27, further comprising:
a storage medium configured to store an index of the corpus of documents; and
wherein the query execution engine is configured to query the index for information matching the search query received from the client computing device.

* * * * *